(12) United States Patent
Higo et al.

(10) Patent No.: US 9,056,941 B2
(45) Date of Patent: Jun. 16, 2015

(54) PHOTOCURABLE RESIN COMPOSITION AND OPTICAL COMPONENT USING THE SAME

(75) Inventors: Yukiko Higo, Ibaraki (JP); Hiroshi Noro, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 12/818,727

(22) Filed: Jun. 18, 2010

(65) Prior Publication Data

US 2010/0324164 A1  Dec. 23, 2010

(30) Foreign Application Priority Data

Jun. 18, 2009 (JP) ................. 2009-145500
Nov. 25, 2009 (JP) ................. 2009-267702
Apr. 1, 2010 (JP) ................. 2010-084867

(51) Int. Cl.
| | |
|---|---|
| C08G 59/22 | (2006.01) |
| C08G 59/30 | (2006.01) |
| C08G 59/68 | (2006.01) |
| C08G 65/18 | (2006.01) |
| C08G 65/10 | (2006.01) |
| C08L 63/00 | (2006.01) |
| G02B 1/04 | (2006.01) |

(52) U.S. Cl.
CPC .............. *C08G 59/226* (2013.01); *C08G 59/30* (2013.01); *C08G 59/688* (2013.01); *C08G 65/105* (2013.01); *C08G 65/18* (2013.01); *C08L 63/00* (2013.01); *G02B 1/04* (2013.01); *G02B 1/041* (2013.01)

(58) Field of Classification Search
CPC .............. C08L 63/00; C08F 2/48; C08F 2/50; C08F 4/6093; C08F 4/6096; C08F 4/6097; C08G 59/027; G02B 1/041; G02C 7/02
USPC ............................................ 522/31, 169, 170
See application file for complete search history.

(56) References Cited

U.S. PATENT DOCUMENTS

| | | | |
|---|---|---|---|
| 4,287,228 A | 9/1981 | Schlesinger | |
| 7,709,598 B2 * | 5/2010 | Kimura et al. ................ | 528/408 |
| 2006/0074138 A1 | 4/2006 | Sasa | |
| 2007/0225458 A1 | 9/2007 | Kimura et al. | |

FOREIGN PATENT DOCUMENTS

| | | |
|---|---|---|
| CN | 1989145 A | 6/2007 |
| DE | 2929313 A1 | 1/1980 |
| EP | 1752463 A1 | 2/2007 |
| JP | 58-187421 A | 11/1983 |
| JP | 09-309943 A | 12/1997 |
| JP | 09-311356 A | 12/1997 |
| JP | 2002-323845 A | 11/2002 |
| JP | 2003-149476 A | 5/2003 |
| JP | 2004-339246 A | 12/2004 |
| JP | 2005-132984 A | 5/2005 |
| JP | 2005-165133 A | 6/2005 |
| JP | 2005-316415 A | 11/2005 |
| JP | 2005-320434 A | 11/2005 |
| JP | 2005-320435 A | 11/2005 |
| JP | 3926380 B1 | 3/2007 |
| JP | 3935494 A | 6/2007 |
| JP | 2007-284550 A | 11/2007 |
| WO | 2005-116038 A1 | 12/2005 |

OTHER PUBLICATIONS

Usui et al.; Machine English translation of JP 2005-132984.*
Usui; Machine English translation of JP 2005-320434.*
European Search Report issued on Nov. 15, 2010 in the corresponding European Patent Application No. 10166145.2.
Chinese Office Action dated Jul. 31, 2012, issued by the State Intellectual Property Office of the People's Republic of China in counterpart Chinese Application No. 201010208551.9.
Office Action issued by the Patent Office of the People's Republic of China dated May 10, 2013 in corresponding application No. 201010208551.9.
Notification of Reasons for Refusal issued by the Japanese Patent Office dated May 14, 2013 in corresponding application No. 2010-084867.
Notification of Reasons for Refusal issued by the Japanese Patent Office dated May 14, 2013 in corresponding application No. 2010-127688.
Communication issued Jan. 22, 2013, from the State Intellectual Property Office of the PR of China, in corresponding Application No. 201010208551.9.
Office Action dated Mar. 13, 2014 issued by the Taiwanese Patent Office in counterpart Taiwanese Patent Application No. 099119988.
Decision of The Intellectual Property Office issued on Nov. 5, 2014, in corresponding TW Application No. TW 099119988.

\* cited by examiner

*Primary Examiner* — Ling Choi
*Assistant Examiner* — Jessica Roswell
(74) *Attorney, Agent, or Firm* — Sughrue Mion, PLLC

(57) ABSTRACT

The present invention relates to a photocurable resin composition including the following ingredients (A), (B) and (C): (A) a linear chain epoxy resin represented by the following general formula (1), in which m indicates an integer of from 2 to 10, and $R_1$ and $R_2$ each represent a hydrogen atom or a fluorine atom; (B) an alicyclic epoxy resin having at least two epoxy groups in one molecule thereof; and (C) a phosphorus fluoride-based photopolymerization initiator.

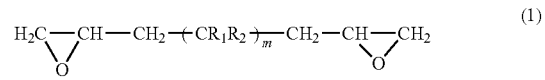

(1)

6 Claims, No Drawings

PHOTOCURABLE RESIN COMPOSITION AND OPTICAL COMPONENT USING THE SAME

FIELD OF THE INVENTION

The present invention relates to a photocurable resin composition having high transparency enough for low-loss transmission of optical signals and having excellent adhesiveness and curability as transparent resins for optical applications, and relates to an optical component using the composition. Specifically, the invention relates to a photocurable resin composition favorable for molding materials for optical components such as lenses (materials for optical components) and for photocurable adhesives for fixation of optical components, and relates to an optical component using the composition.

BACKGROUND OF THE INVENTION

Recently, optical components such as optical lenses and optical recording media have been required to satisfy high density, high heat resistance and stable production; and for satisfying these requirements, for example, a method of producing optical three-dimensional molded articles (optical components) by pressing a shaping mold against a resin material to thereby form a specific micropattern or an odd-shaped article has been investigated (for example, see Patent Document 1).

The method of producing optical three-dimensional molded articles includes two types from the viewpoint of dimensional stability. For example, there are mentioned (1) a method including hot-melting a thermoplastic material, then pressing a shaping mold against it, and cooling it to obtain a molded article having a specific shape; and (2) a method including pressing a shaping mold against a photocurable resin, and then irradiating it with light through the shaping mold or a substrate to obtain an optical, three-dimensional molded article having a specific shape.

In general, these two types of methods are selected depending on the required heatproof temperature; and for example, in the field not requiring heat resistance, the method (1) of using a transparent thermoplastic resin such as polymethyl methacrylate (PMMA) or polycarbonate is widely employed. On the other hand, in the field of requiring heat resistance for reflow soldering or autoclaving etc., application of a photocurable resin including an epoxy resin as the main ingredient has been investigated, and the method (2) is being put into practical use.

In producing optical three-dimensional molded articles according to the method (2), a material curable within a short period of time is used, and the optical three-dimensional molded articles thus produced are required to have high transparency and excellent mechanical properties.

In the photocurable resin composition for the method (2), an antimony compound-based photopolymerization initiator excellent in curability, transparency, mechanical strength and thermal decomposition resistance has been heretofore much used. However, antimony compounds are highly toxic and are considered as worrisome, environmental load substances; and these days, therefore, more ecological materials including an antimony-free photopolymerization initiator are specifically noted (for example, see Patent Document 2).

Patent Document 1: Japanese Patent No. 3926380
Patent Document 2: WO2005/116038

SUMMARY OF THE INVENTION

In case where the optical three-dimensional molded articles as above are used for optical components, they are required to have high transparency and excellent adhesiveness to objects (e.g., glass) to which they are bonded. In particular, in the above method (2), materials having rapid curability and excellent in adhesiveness to target objects (e.g., glass) are used, and the optical three-dimensional molded articles produced therein are required to have high transparency.

As the photopolymerization initiator for the photocurable resins, antimony compounds that secure relatively rapid curing has been used, but their use is unfavorable since they are substances under environmental limitation. When the amount of the antimony compound-based photopolymerization initiator to be added is increased for the purpose of securing good curing, there may occur another problem in that the discoloration resistance of the cured products worsens.

On the other hand, in general, in case where an antimony-free photopolymerization initiator is used, the mechanical properties and the thermal decomposition temperature of the cured products may lower as compared with those of the cured products obtained by the use of an antimony-based photopolymerization initiator, and there is a problem in that satisfactory products could not be obtained in that case. The photopolymerization initiator disclosed in Patent Document 2 has been developed recently as an antimony-free photopolymerization initiator capable of solving these problems; however, it could hardly satisfy both transparency (or thermal discoloration resistance) and photocurability, and there still remains a matter for studies thereon.

The present invention has been made in consideration of the situation as above, and an object thereof is to provide a photocurable resin composition which is friendly to the environment, rapidly curable and excellent in adhesiveness to glass and others, of which the cured products are excellent in thermal discoloration resistance, and which is therefore useful as a molding material for three-dimensional structures having high transparency, for example, optical components such as lenses, and also as a photocurable adhesive for fixation of optical components, and to provide an optical component using the composition.

To attain the above object, the present invention relates to the following items 1. to 5.

1. A photocurable resin composition including the following ingredients (A), (B) and (C):

(A) a linear chain epoxy resin represented by the following general formula (1):

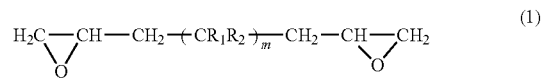  (1)

in which m indicates an integer of from 2 to 10, and $R_1$ and $R_2$ each represent a hydrogen atom or a fluorine atom;

(B) an alicyclic epoxy resin having at least two epoxy groups in one molecule thereof; and (C) a phosphorus fluoride-based photopolymerization initiator.

2. The photocurable resin composition according to item 1, in which the ingredient (C) includes an anion component and a cation component, and the anion component is an onium salt having a structure represented by the following general formula (2):

$$[PF_n(X)_{6-n}]^-$$  (2)

in which n indicates an integer of from 1 to 6, and X represents a fluoroalkyl group having from 1 to 9 carbon atoms or a fluorophenyl group.

3. The photocurable resin composition according to item 2, in which, in the anion component represented by the general formula (2), n is an integer of from 1 to 5.

4. The photocurable resin composition according to any one of items 1 to 3, further containing the following ingredient (D):

(D) an oxetane compound having at least one oxetanyl group in one molecule thereof.

5. An optical component obtained by using the photocurable resin composition according to any one of items 1 to 4.

Specifically, the present inventors have assiduously studied for the purpose of solving the above-mentioned problems and, as a result, have found that when a linear chain epoxy resin of the above general formula (1) (ingredient A) and an alicyclic epoxy resin having at least two epoxy groups in one molecule thereof (ingredient B) are combined, then the resulting composition has rapid curability and secures improved adhesiveness to glass and others. In addition, the inventors have found that, when these epoxy resins are combined with a specific antimony-free photopolymerization initiator, then a less toxic, photocurable resin composition can be obtained, and the elastic modulus of the cured products of the composition can be reduced, and the stress to occur in molding the composition can be effectively reduced. Further, the inventors have found that, when an oxetane compound having at least one oxetanyl group in one molecule thereof is incorporated in the composition, then the composition may have discoloration resistance and its mechanical properties may be improved. Thus, the inventors have come to the conviction that the intended object can be attained by these findings, and have achieved the invention.

As in the above, the photocurable resin composition of the invention includes a combination of a linear chain epoxy resin represented by the above general formula (1) (ingredient A) and an alicyclic epoxy resin having at least two epoxy groups in one molecule thereof (ingredient B), thereby having improved curability. In addition, an antimony-free photopolymerization initiator is used therein, the composition is less toxic, rapidly curable and excellent in adhesiveness to glass and others, and the three-dimensional structures formed of the composition has high transparency. Containing the linear epoxy resin of the above general formula (1) (ingredient A), the outgassing amount from the composition in curing may be reduced. The photocurable resin composition of the invention preferably further includes the oxetane compound, and it may further enhance the rapid curability of the composition and may enhance the mechanical properties thereof through elevation of the glass transition temperature and the heatproof temperature of the composition. In addition, since the oxetane compound promotes the curability of the composition, the amount of the phosphorus fluoride-based photopolymerization initiator (ingredient C) that may have some influence on the discoloration resistance of the composition may be reduced, and therefore the cured product cane still realize high transparency after heating treatment. Accordingly, the invention can reduce the environmental load and can solve the problem of discoloration by heat in reflow soldering, therefore bringing about reliability improvement.

Further, the resin composition can be cured on a transparent substrate such as glass or the like, and can be integrated with the substrate to obtain high-quality hybrid lenses. Accordingly, in case where the photocurable resin composition of the invention is used as a molding material for optical components such as lenses, or as a photocurable adhesive for fixation of optical components, it is useful as producing optical components of high reliability.

The optical component of the invention obtained by using the photocurable resin composition is discolored little even when heated in reflow soldering, and is therefore advantageously used in packaging through reflow soldering.

DETAILED DESCRIPTION OF THE INVENTION

Embodiments of the invention are described below.

The photocurable resin composition for optical components of the invention (this may be hereinafter abbreviated as "the resin composition") includes the above-mentioned specific linear chain epoxy resin (ingredient A), an alicyclic epoxy resin having at least two epoxy groups in one molecule thereof (ingredient B), a phosphorus fluoride-based photopolymerization initiator (ingredient C), preferably along with an oxetan compound having at least one oxetanyl group in one molecule thereof to be described below (ingredient D); and in general, this is used as a liquid resin composition.

The specific linear chain epoxy resin (ingredient A) is represented by the following general formula (1); and by using this ingredient, it is possible to reduce the outgassing amount from the composition in curing:

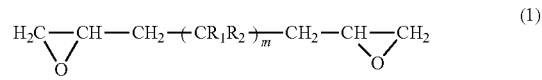

(1)

in which m indicates an integer of from 2 to 10, and $R_1$ and $R_2$ each represent a hydrogen atom or a fluorine atom.

In the above formula (1), m indicates an integer of from 2 to 10, but is preferably an integer of from 2 to 6 from the viewpoint of the curability and the flowability of the composition.

The content (ratio by weight) of the specific linear chain epoxy resin (ingredient A) to be in the photocurable resin composition is preferably within a range of from 20 to 80% by weight (hereinafter this is abbreviated as "%") of all the epoxy resins in the composition, more preferably within a range of from 30 to 70%, most preferably within a range of from 30 to 50%. In case where the photocurable resin composition contains an oxetane compound (ingredient D) to be mentioned below, the content of the specific linear chain epoxy resin (ingredient A) in the composition is preferably within a range of from 10 to 75% by weight (hereinafter this is abbreviated as "%") of all the resin ingredients (total weight of the ingredients A, B and D) in the composition, more preferably within a range of from 15 to 70%, most preferably within a range of from 20 to 65%. Specifically, when the content of the specific linear chain epoxy resin (ingredient A) is too small, then the outgassing amount from the composition in curing may tend to increase though the adhesive force of the composition could increase; but on the contrary, when it is too large, the curability of the composition may tend to worsen and the workability thereof may therefore tend to worsen.

The specific linear chain epoxy resin (ingredient A) may be prepared, for example, by oxidizing a compound having a vinyl group at both terminals. The oxidation may be, for example, direct oxidation with an organic peroxide such as perbenzoic acid, or oxidation with hydrogen peroxide or gaseous oxygen using a heteropolyacid as a catalyst.

In the invention, an alicyclic epoxy resin having at least two epoxy groups in one molecule thereof (ingredient B) is used along with the above-mentioned, specific linear chain epoxy resin (ingredient A); and combining the two enhances the curability of the composition. As the alicyclic epoxy resin (ingredient B), one having high reactivity and transparency is preferably used; and especially preferred is a 6-membered ring-having alicyclic epoxy resin as its structure is stable. From the viewpoint of the transparency, the viscosity and the reactivity thereof, examples of the alicyclic epoxy resin (ingredient B) concretely include 3,4-epoxycyclohexylmethyl 3,4-epoxycyclohexanecarboxylate, 3,4-epoxycyclohexylethyl 3,4-epoxycyclohexanecarboxylate. These alicyclic epoxy resins may be used alone or in combination thereof.

The content of the alicyclic epoxy resin (ingredient B) in the photocurable resin composition is preferably within a range of from 20 to 80% of all the epoxy resins in the composition, more preferably within a range of from 30 to 70%. In case where the photocurable resin composition contains an oxetane compound (ingredient D) to be mentioned below, the content of the alicyclic epoxy resin (ingredient B) in the composition is preferably within a range of from 20 to 85% of all the resin ingredients (total weight of the ingredients A, B and D) in the composition, more preferably within a range of from 25 to 75%. Specifically, when the content of the alicyclic epoxy resin (ingredient B) is beyond the above range, then the curability of the composition may worsen and the discoloration resistance of the cured product may also worsen.

As the phosphorus fluoride-based photopolymerization initiator (ingredient C) to be in the resin composition along with the specific linear chain epoxy resin (ingredient A) and the alicyclic epoxy resin (ingredient B) therein, preferred is an onium salt including an anion component and a cation component, in which the anion component may have a structure represented by the following general formula (2). In the general formula (2), n indicates an integer of from 1 to 6 as described below, but from the viewpoint of the photocurability of the composition, n is preferably an integer of from 1 to 5, more preferably an integer of from 1 to 4. Specifically, examples of such an onium salt include aromatic onium salts, aromatic iodonium salts, aromatic sulfoxonium salts. These onium salts may be used alone or in combination thereof. Above all, from the viewpoint of the photocurability, aromatic sulfonium salts are preferred. For enhancing the thermal decomposition resistance and the stable mechanical properties, a phosphorus fluoride-based photopolymerization initiator of formula (2) where n is not 6 is preferably used.

$$[PF_n(X)_{6-n}]^- \quad (2)$$

in which n indicates an integer of from 1 to 6, and X represents a fluoroalkyl group having from 1 to 9 carbon atoms or a fluorophenyl group.

The blend ratio of the specific photopolymerization initiator (ingredient C) is preferably within a range of from 1 to 15 parts by weight (hereinafter abbreviated as "parts") relative to 100 parts of the total of the specific linear chain epoxy resin (ingredient A) and the alicyclic epoxy resin (ingredient B), more preferably within a range of from 2 to 10 parts. In case where the composition contains the ingredients (A) and (B), and also the ingredient (D) to be mentioned below, the proportion of the initiator is preferably within a range of from 0.01 to 7 parts relative to 100 parts of the total amount of all these ingredients (all the resin ingredients in the photocurable resin composition), more preferably within a range of from 0.1 to 5 parts. Specifically, when the blend ratio of the specific photopolymerization initiator (ingredient C) is too small, the curability of the composition may tend to worsen; but on the contrary, when it is too large, there may be a probability that the discoloration resistance of the cured product may worsen though the curability of the composition could increase.

As the oxetane compound (ingredient D) that is preferably used in the composition along with the above-mentioned ingredients (A) to (C) is, a compound having at least one oxetanyl group in one molecule thereof can be used, as so mentioned in the above. Examples of the oxetane compound include 3-ethyl-3-{[(3-ethyloxetan-3-yl)methoxy]methyl}oxetane, 1,4-bis[(3-ethyl-3-oxetanylmethoxy)methyl]benzene, di[2-(3-oxetanyl)butyl]ether, 3-ethyl-3-phenoxymethyloxetane, 3-ethyl-3-hydroxymethyloxetane, 3-ethyl-3(4-hydroxybutyl)oxymethyloxetane, 1,4-bis[(3-ethyloxetan-3-yl)methoxy]benzene, 1,3-bis[(3-ethyloxetan-3-yl)methoxy]benzene, 1,2-bis[(3-ethyloxetan-3-yl)methoxy]benzene, 4,4'-bis[(3-ethyloxetan-3-yl)methoxy]biphenyl, 2,2'-bis[(3-ethyl-3-oxetanyl)methoxy]biphenyl, 3,3',5,5'-tetramethyl-[4,4'-bis(3-ethyloxetan-3-yl)methoxy]biphenyl, 2,7-bis[(3-ethyloxetan-3-yl)methoxy]naphthalene, 1,6-bis[(3-ethyloxetan-3-yl)methoxy]-2,2,3,3,4,4,5,5-octafluorohexane, 3(4),8(9)-bis[(1-ethyl-3-oxetanyl)methoxymethyl]-tricyclo[5.2.1.2.6]decane, 1,2-bis{[2-(1-ethyl-3-oxetanyl)methoxy]ethylthio}ethane, 4,4'-bis[(1-ethyl-3-oxetanyl)methyl]thiodibenzene thioether, 2,3-[(3-ethyloxetan-3-yl)methoxymethyl]norbornane, 2-ethyl-2-[(3-ethyloxetan-3-yl)methoxymethyl]-1,3-O-bis[(1-ethyl-3-oxetanyl)methyl]-propane-1,3-diol, 2,2-dimethyl-1,3-O-bis[(3-ethyloxetan-3-yl)methyl]-propane-1,3-diol, 2-butyl-2-ethyl-1,3-O-bis[(3-ethyloxetan-3-yl)methyl]-propane-1,3-diol, 1,4-O-bis[(3-ethyloxetan-3-yl)methyl]-butane-1,4-diol, 2,4,6-O-tris[(3-ethyloxetan-3-yl)methyl]cyanurate. These oxetane compounds may be used alone or in combination thereof. Above all, from the viewpoint of the curing acceleration and the discoloration resistance, 3-ethyl-3(4-hydroxybutyl)oxymethyloxetane, 3-ethyl-3-hydroxymethyloxetane, 3-ethyl-3-{[(3-ethyloxetan-3-yl)]methoxy]methyl}oxetane, or 1,4-bis[(3-ethyl-3-oxetanylmethoxy)methyl]benzene is preferably used.

The content (ratio by weight) of the oxetane compound of the ingredient (D) in the composition is preferably within a range of from 3 to 30% of all the resin ingredients therein (total weight of the ingredients A to D) from the viewpoint of the curability and the adhesiveness of the composition, more preferably within a range of from 3 to 20%.

In addition to the ingredients (A) to (D) therein, the photocurable resin composition of the invention may further contain, if desired, a photo sensitizer such as anthracene, phenanthrene, carbazole or naphthalene, a silane-based or titanium-based adhesiveness enhancing agent, a flexibility enhancing agent such as a synthetic rubber or a silicone compound, as well as an antioxidant, a defoaming agent, an inorganic filler, etc.

The photocurable resin composition of the invention may be produced, for example, by blending the specific linear chain epoxy resin (ingredient A), the alicyclic epoxy resin having at least two epoxy groups in one molecule thereof (ingredient B), the phosphorus fluoride-based photopolymerization initiator (ingredient C) and optionally the ingredient (D) and other additives, in a predetermined ratio and mixing them.

The transmittance of the photocurable resin composition of the invention thus produced is at least 90% in an atmosphere at 25° C. and in an ordinary visible light region (400 to 800 nm) and an IR region, preferably at least 93%, more preferably at least 95%. The transmittance may be measured with a spectrophotometer.

The photocurable resin composition of the invention may be cured, for example, as follows. Briefly, the composition is potted on a transparent substrate such as glass, then a desired shaping mold is pressed against it so that the mold is filled with the photocurable resin composition, and this is irradiated with light to cure the composition. If desired, this may be heat-treated at a predetermined temperature. Regarding the condition for the heat treatment, preferably, the cured product is heated at 80 to 170° C. for 1 hour or so. For the photoirradiation, for example, a UV lamp or the like may be used as the device; and the irradiation energy is preferably from 2000 to 200000 mJ/cm². Specifically, when the irradiation energy is less than 2000 mJ/cm², then the curing may be insufficient and a desired shape of the curing product could not be formed on the substrate; but on the contrary, when it is more than 200000 mJ/cm², then over-irradiation may cause photodegradation of the cured product and the product may be discolored in the subsequent heat treatment or the like.

Not limited to the above-mentioned molding with a mold, the photocurable resin composition of the invention may be sheet-wise shaped. The resulting sheet may be irradiated with light, using a UV lamp or the like as in the above, and may be thereby cured. As the light source for the photoirradiation, for example, usable are a low-pressure mercury lamp, a high-pressure mercury lamp, an ultra-high-pressure mercury lamp, a xenon lamp, etc.

The photocurable resin composition of the invention can be used as a molding material for optical components such as lenses (material for optical components), and as a photocurable adhesive for fixation of optical components, etc. The photocurable resin composition of the invention can be used for optical components such as optical lenses.

The glass transition temperature of the optical component (cured resin product) of the invention such as typically lenses is preferably 100° C. or more from the viewpoint of the temperature cycle durability and the heat resistance, more preferably 120° C. or more. Specifically, when the glass transition temperature is lower than the above-mentioned temperature, as the case may be, the thermal shrinkage of the optical component may increase in temperature cycles, and for example, owing to the mismatch between the glass transition temperature of the optical component and the thermal expansion coefficient of the antireflection coating material for the optical component, the antireflection coating material may be delaminated or cracked.

As described in the above, the photocurable resin composition and the optical component using the same of the invention discolor little even when heated in reflow soldering, and are therefore advantageous for packaging by reflow soldering.

EXAMPLES

The invention is described with reference to the following Examples and Comparative Examples or Reference Examples. However, the invention should not be restricted by these Examples.

Examples 1 to 8

Comparative Examples 1 and 2

Prior to Examples and Comparative Examples of a photocurable resin composition containing the above ingredients (A) to (C), the following materials were prepared.

Linear chain epoxy resin 1 (ingredient A): a linear epoxy resin of formula (1) in which $R_1$ and $R_2$ are fluorine atoms and m=4.

Linear chain epoxy resin 2 (ingredient A): a linear epoxy resin of formula (1) in which $R_1$ and $R_2$ are hydrogen atoms and m=4.

Alicyclic epoxy resin (ingredient B): an alicyclic epoxy resin represented by the following structural formula (3):

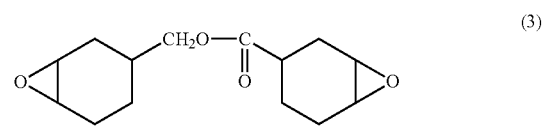

(3)

Photopolymerization initiator 1 (ingredient C): a bissulfonium salt-based photopolymerization initiator composed of a phosphorus-containing anion component (formula (2), in which n=6) and a cation component, represented by the following structural formula (4):

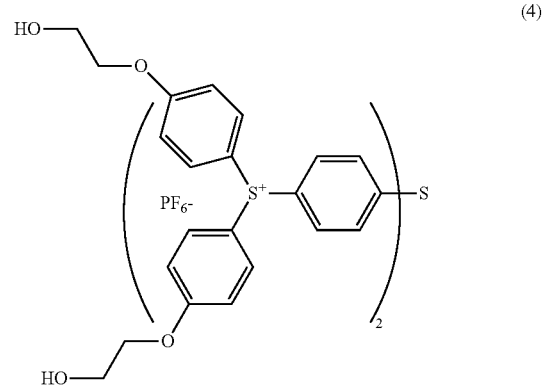

(4)

Photopolymerization initiator 2 (ingredient C): a triarylsulfonium salt-based photopolymerization initiator composed of a phosphorus-containing anion component (formula (2), in which n=4, $X=-CF_2CF_3$) and a cation component, represented by the following structural formula (5):

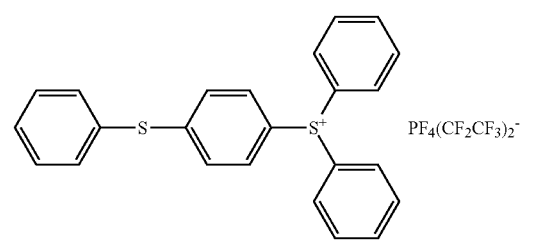

(5)

Photopolymerization initiator 3 (ingredient C): a triarylsulfonium salt-based photopolymerization initiator composed of a phosphorus-containing anion component (formula (2), in which n=6) and a cation component, represented by the following structural formula (6):

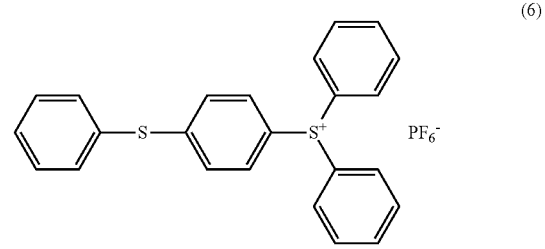

(6)

Photopolymerization initiator 4 (ingredient C): a sulfonium salt-based photopolymerization initiator composed of a phosphorus-containing anion component (formula (2), in which n=6) and a cation component (mixture of monosulfonium salt and bissulfonium salt, Lamberti's Esacure 1064), represented by the following structural formula (7):

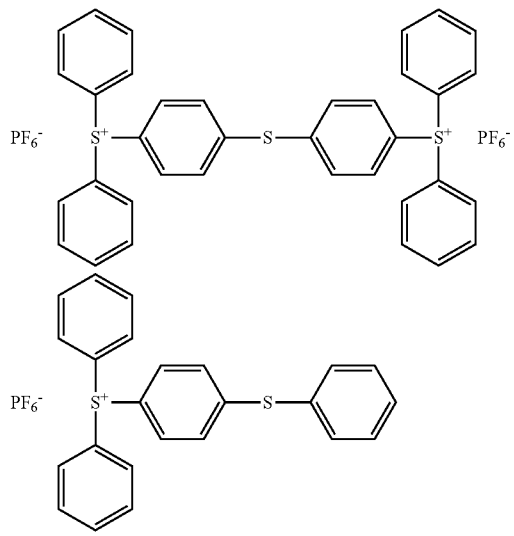

Photopolymerization initiator 5 (ingredient C): a sulfonium salt-based photopolymerization initiator composed of a phosphorus-containing anion component (formula (2), in which n=6) and a cation component (mixture of monosulfonium salt and bissulfonium salt, Dow Chemical's UV16992), represented by the following structural formula (8):

Photopolymerization initiator 6 (for Comparative Examples): a bissulfonium salt-based photopolymerization initiator composed of an antimony-containing anion component ($SbF_6^-$) and a cation component, represented by the following structural formula (9):

Antioxidant: 9,10-dihydro-9-oxa-10-phosphaphenanthrene-10-oxide

Coupling agent: γ-glycidoxypropylmethoxysilane

The ingredients shown in the following Table 1 were blended in the ratio indicated in the Table, and mixed to prepare a photocurable resin composition. Incidentally, the blend amount of the photopolymerization initiator shown in Table 1 is a blending amount as 50 wt % propylene carbonate solution.

TABLE 1

|  |  | Example |  |  |  |  |  |  |  | Comparative Example (part by weight) |  |
|---|---|---|---|---|---|---|---|---|---|---|---|
|  |  | 1 | 2 | 3 | 4 | 5 | 6 | 7 | 8 | 1 | 2 |
| Linear Chain Epoxy | 1 | 50 | 50 | 50 | 50 | 50 | — | 40 | 30 | 50 | — |
| Resin | 2 | — | — | — | — | — | 50 | — | — | — | 50 |
| Alicyclic Epoxy Resin |  | 50 | 50 | 50 | 50 | 50 | 50 | 60 | 70 | 50 | 50 |
| Photopolymerization | 1 | 4 | — | — | — | — | — | — | — | — | — |
| Initiator | 2 | — | 4 | — | — | — | — | — | — | — | — |
|  | 3 | — | — | 4 | — | — | 4 | 4 | 4 | — | — |
|  | 4 | — | — | — | 4 | — | — | — | — | — | — |
|  | 5 | — | — | — | — | 4 | — | — | — | — | — |
|  | 6 | — | — | — | — | — | — | — | — | 4 | 4 |
| Antioxidant |  | 0.54 | 0.54 | 0.54 | 0.54 | 0.54 | 0.54 | 0.54 | 0.54 | 0.54 | 0.54 |
| Coupling Agent |  | 1 | 1 | 1 | 1 | 1 | 1 | 1 | 1 | 1 | 1 |

Thus produced, the photocurable resin compositions were tested and evaluated for the properties thereof according to the standards mentioned below. The results are shown in Table 2 below.

Adhesive Strength

Columnar holes each having a diameter of 2 mm was formed in a thermosetting silicone resin plate (2 cm length×1 cm width×200 μm thickness) to prepare a silicone mold. Next, the silicone mold was airtightly attached to a glass sheet (Schott's D-263, having a thickness of 0.55 mm), and the above photocurable resin composition was filled into these 6 columnar holes. The upper side of the photocurable resin composition-filled silicone mold was airtightly covered with a PET film (having a thickness of 50 μm), and then this was set on an irradiation stage with turning it upside down so that it could be irradiated with light on the glass side thereof. Using a UV lamp (Ushio's Deep UV Lamp), this was irradiated with light so that the irradiation energy to the photocurable resin composition could be 6000 mJ/cm$^2$, and then heat-treated at 150° C. for 1 hour to thereby cure the photocurable resin composition. Subsequently, the PET film and the silicone mold were removed to obtain an adhesion test sample having columnar bumps on a glass sheet (sample for evaluation of adhesive strength). Next, using a bump pull tester, the adhesion test sample was tested at 25° C. for the shear adhesive strength. The adhesiveness was evaluated as follows: Those having an adhesive strength of 4 MPa or more are good (A); and those having an adhesive strength of less than 4 MPa are not good (B).

Transparency

The photocurable resin composition was formed into a film having a thickness of 900 μm on a silicone-release-treated PET film (Mitsubishi Chemical Polyester Film's Diafoil MRF-50), and this was photoirradiated (quantity of light, 8000 mJ/cm$^2$) for primary curing. Subsequently, this was heat-treated at 100° C. for 1 hour to obtain a cured product. 3 cm-square test pieces were cut out of the cured product. Using a color computer (Suga Test Instruments' SM-T), the test piece was analyzed in a transmission mode to determine the yellow index (Y.I.) thereof, from which the transparency of the sample was evaluated. The transparency evaluation was as follows: Those having Y.I. of 10 or less are good (A); and those having Y.I. of more than 10 are not good (B).

Curability (Gel Time)

Using a UV rheometer (by Rheologica, having 10 mmφ aluminium parallel plates) with a mercury lamp (Hamamatsu Photonics' LC-8, this was so set that its illuminance at 365 nm could be 10 mW/cm$^2$) as the light source, the gel time of the sample was determined to evaluate the curability thereof. The viscoelasticity of the photocurable resin composition was measured at 25° C., using the UV rheometer, and the intersection point of the elastic term (G') and the viscous term (G") indicates the gel time of the sample. Regarding the evaluation of the curability, those of which the gel time was 350 seconds or less are good (A); and those of which the gel time was more than 350 seconds are not good (B).

Transmittance

The photocurable resin composition was formed into a film having a thickness of 900 μm on a silicone-release-treated PET film (Mitsubishi Chemical Polyester Film's Diafoil MRF-50), and this was photoirradiated (quantity of light, 8000 mJ/cm$^2$) for primary curing. Subsequently, this was heat-treated at 100° C. for 1 hour to obtain a sample for transmittance measurement (cured product having a thickness of 900 μm). The sample was immersed in a liquid paraffin in a quartz cell, and with the light scattering on the surface of the sample kept controlled, this was analyzed for the transmittance at a wavelength of 600 nm at room temperature (25° C.), using a spectrophotometer (Shimadzu's UV3101).

TABLE 2

|  |  | Example | | | | | | | | Comparative Example | |
| --- | --- | --- | --- | --- | --- | --- | --- | --- | --- | --- | --- |
|  |  | 1 | 2 | 3 | 4 | 5 | 6 | 7 | 8 | 1 | 2 |
| Adhesive Strength | (Mpa) | 6.20 | 6.67 | 7.29 | 6.28 | 5.69 | 6.89 | 7.02 | 5.17 | 3.81 | 2.04 |
|  | evaluation | A | A | A | A | A | A | A | A | B | B |
| Transparency | (Y.I.) | 3.97 | 8.78 | 3.15 | 3.43 | 3.43 | 2.32 | 2.90 | 2.72 | 6.96 | 31.84 |
|  | evaluation | A | A | A | A | A | A | A | A | A | B |
| Curability (gel time) | (sec) | 219.5 | 193.8 | 265.2 | 288.6 | 251.1 | 56.9 | 274.5 | 344.7 | 282.7 | 74.2 |
|  | evaluation | A | A | A | A | A | A | A | A | A | A |
| Transmittance (%) |  | 97.5 | 91.7 | 95.2 | 96.7 | 96.7 | 93.8 | 100.0 | 92.0 | 98.0 | 87.5 |

As is clear from the results in the above Table 2, all the samples of Examples were excellent in adhesiveness not detracting from the curability, and excellent in transparency as having a low Y.I. value, and had good transmittance, as compared with the samples of Comparative Examples.

The blend ratio of the photopolymerization initiator 1 to 5 (ingredient C) was 4 parts in Examples. The inventors further confirmed that when the blend ratio was changed to 1 part or 15 parts, the same excellent effects as in Examples could be obtained.

As opposed to this, in the sample of Comparative Example 1 and in the sample of Comparative Example 2, the photopolymerization initiator 6 was used instead of the photopolymerization initiators 1 to 5 (ingredient C), and therefore, these samples were poor in adhesiveness. The sample of Comparative Example 2 had good curability, but was poor in transparency and transmittance as having a high Y.I. value.

Examples 9 to 18

Reference Examples 1 to 3

Prior to Examples and Reference Examples of a photocurable resin composition containing the above ingredients (A) to (D), the following materials were prepared.

Epoxy resin (a) (ingredient A): This is the same as the linear chain epoxy resin 1 (ingredient A).

Epoxy resin (b) (ingredient B): This is the same as the alicyclic epoxy resin represented by the above chemical formula (3) (ingredient B).

Photopolymerization initiator (a) (ingredient C): This is the same as the photopolymerization initiator 2 represented by the above structural formula (5) (ingredient C).

Photopolymerization initiator (b) (ingredient C): This is the same as the photopolymerization initiator 3 represented by the above structural formula (6) (ingredient C).

Photopolymerization initiator (c) (ingredient C): This is the same as the photopolymerization initiator 1 represented by the above structural formula (4) (ingredient C).

Oxetane compound (a) (ingredient D): 3-ethyl-3-{[(3-ethyloxetan-3-yl)methoxy]methyl}oxetane Oxetane compound (b) (ingredient D): 3-ethyl-3-hydroxymethyloxetane Oxetane compound (c) (ingredient D): 1,4-bis[(3-ethyl-3-oxetanylmethoxy)methyl]benzene Oxetane compound (d) (ingredient D): 3-ethyl-3(4-hydroxybutyl)oxymethyloxetane Antioxidant: 9,10-dihydro-9-oxa-10-phosphaphenanthrene-10-oxide Coupling agent: γ-glycidoxypropylmethoxysilane The above-mentioned epoxy resin, alicyclic epoxy resin, oxetane compound, antioxidant and coupling agent were blended in the ratio shown in Table 3 and Table 4 given below, then optionally heated, and melt-mixed. Subsequently, the above photopolymerization initiator was incorporated in the blend in the ratio also shown in Table 3 and Table 4, and mixed to thereby prepare a photocurable resin composition. Incidentally, the blend amount of the photopolymerization initiator shown in Table 3 and Table 4 is a blending amount as 50 wt % propylene carbonate solution.

Thus produced, the photocurable resin compositions were tested and evaluated for the properties thereof according to the standards mentioned below. The results are shown in the following Table 3 and Table 4.

Curability (Gel Time)

Using a UV rheometer (by Rheologica, having 10 mmφ aluminium parallel plates) with a mercury lamp (Hamamatsu Photonics' LC-8, this was so set that its illuminance at 365 nm could be 30 mW/cm$^2$) as the light source, the gel time of the sample was determined to evaluate the curability thereof. The viscoelasticity of the photocurable resin composition was measured at 25° C., using the UV rheometer, and the arrival time to $10^5$ Pa for the elastic term (G') was taken as the gel time determined with the UV rheometer. Regarding the evaluation of the curability, those of which the gel time was longer than 800 seconds are not good (C), those of which the gel time was 800 seconds or lower but longer than 300 seconds are good (B), and those of which the gel time was 300 seconds or lower are excellent (A).

Thermal Discoloration Resistance (Transparency)

The photocurable resin composition was formed into a film having a thickness of 600 μm on a silicone-release-treated PET film (Mitsubishi Chemical Polyester Film's Diafoil MRF-50), and this was photoirradiated (quantity of light, 8000 mJ/cm$^2$) for primary curing. Subsequently, this was heat-treated at 150° C. for 1 hour to obtain a cured product. The cured product was cut into 3 cm-square test pieces, and these were led to pass through a reflowing furnace at 260° C., taking 10 seconds. Using a color computer (Suga Test Instruments' SM-T), the test piece was analyzed in a transmission mode to determine the yellow index (Y.I.) thereof, from which the transparency of the sample was evaluated. Those having a lower Y.I. value are less discolored and have high transparency. The transparency evaluation was as follows: Those having Y.I. of 13 or more are not good (C), those having Y.I. of less than 13 but more than 10 are good (B), and those having Y.I. of 10 or lower are excellent (A).

Cracking Resistance

The test pieces for discoloration resistance evaluation after heat treatment in the reflowing furnace at 260° C. for 10 seconds were checked for cracking. Cracked samples are not good (B); samples with no cracks are good (A); and broken samples are bad (C).

Thermal Decomposition Temperature

A cured product was produced in the same manner as that for the production of the samples for glass transition temperature measurement. A sample was cut out of it so as to have a weight of 10 mg, and checked for the weight change in heating. Using a differential thermal balance (Rigaku's TG8120), the weight loss of the sample was measured within a temperature range of from room temperature (25° C.) to 400° C.; and the temperature for 5% weight loss was taken as the thermal decomposition temperature of the sample. In this test, the samples were evaluated as follows: Those having a temperature for 5% weight loss of lower than 130° C. are not good (D), those having a temperature for 5% weight loss of 130° C. or higher but lower than 270° C. are average (C), those having a temperature for 5% weight loss of 270° C. or higher but lower than 300° C. are good (B), and those having a temperature for 5% weight loss of 300° C. or higher are excellent (A).

Glass Transition Temperature

Each resin composition was formed into a film having a thickness of 600 μm on a silicone-release-treated PET film (Mitsubishi Chemical Polyester Film's Diafoil MRA-50), and this was irradiated with UV rays (UV amount, 8000 mJ/cm$^2$) for primary curing. Subsequently, this was cured at 150° C. for 1 hour to obtain a molded product. The molded product was cut into test pieces each having a width of 5 mm and a length of 25 mm. Using a dynamic viscoelastometer (Rheometrics' RSA-III), the storage elastic modulus and the loss elastic modulus of the test piece were measured at a frequency of 1 Hz and within a temperature range of from room temperature (25° C.) to 260° C., and a tan δ curve derived from those data was drawn. The peak temperature of the thus-drawn tan δ curve was taken as the glass transition temperature (Tg) of the sample. In this test, the samples were evaluated as follows: Those having Tg of lower than 70° C. are not good (D), those having Tg of 70° C. or higher but lower than 100° C. are average (C), those having Tg of 100° C. or higher but lower than 120° C. are good (B), and those having Tg of 120° C. or higher are excellent (A).

TABLE 3

(part by weight)

| | | Example | | | | | | | | | |
|---|---|---|---|---|---|---|---|---|---|---|---|
| | | 9 | 10 | 11 | 12 | 13 | 14 | 15 | 16 | 17 | 18 |
| Epoxy Resin | a | 47.5 | 45 | 45 | 45 | 42.5 | 45 | 43 | 45 | 45 | 46 |
| | b | 47.5 | 45 | 45 | 45 | 42.5 | 45 | 43 | 45 | 45 | 46 |
| Oxetane Compound | a | 5 | 5 | 10 | — | 7.5 | 2.5 | — | 10 | — | — |
| | b | — | 5 | — | 10 | 7.5 | 2.5 | — | — | 10 | — |
| | c | — | — | — | — | — | — | 14 | — | — | — |
| | d | — | — | — | — | — | — | — | — | — | 8 |

TABLE 3-continued

| | | Example (part by weight) | | | | | | | | | |
|---|---|---|---|---|---|---|---|---|---|---|---|
| | | 9 | 10 | 11 | 12 | 13 | 14 | 15 | 16 | 17 | 18 |
| Photopolymerization Initiator | a | 1 | 3 | 2 | 2 | 1 | 2 | 1.7 | — | — | 1 |
| | b | — | — | — | — | — | — | — | — | 1.5 | — |
| | c | — | — | — | — | — | — | — | 1.5 | — | — |
| Antioxidant | | 0.5 | 0.5 | 0.5 | 0.5 | 0.5 | 0.5 | 0.5 | 0.5 | 0.5 | 0.5 |
| Coupling Agent | | 5 | 5 | 1 | 1 | 3 | 1 | 1 | 1 | 1 | 1 |
| Curability (gel time) | sec | 759 | 72 | 217 | 72 | 43 | 54.6 | 111 | 306 | 212 | 128 |
| | evaluation | B | A | A | A | A | A | A | B | A | A |
| Thermal Discoloration Resistance | (Y.I.) | 4.55 | 12.97 | 12.4 | 3.83 | 5.79 | 6.69 | 12.94 | 8.50 | 7.90 | 4.00 |
| | evaluation | A | B | B | A | A | A | B | A | A | A |
| Cracking Resistance | | A | A | A | A | A | A | A | B | B | A |
| Thermal Decomposition Temperature | (° C.) | 277 | 293 | 270 | 283 | 304 | 281 | 278 | 134 | 148 | 329 |
| | evaluation | B | B | B | B | A | B | B | C | C | A |
| Glass Transition Temperature | (° C.) | 120 | 120 | 104 | 126 | 129 | 123 | 146 | 78 | 73 | 121 |
| | evaluation | A | A | B | A | A | A | A | C | C | A |

TABLE 4

| | | Reference Example (part by weight) | | |
|---|---|---|---|---|
| | | 1 | 2 | 3 |
| Epoxy Resin | a | 50 | 50 | 50 |
| | b | 50 | 50 | 50 |
| Oxetane Compound | a | — | — | — |
| | b | — | — | — |
| | c | — | — | — |
| Photopolymerization Initiator | a | 1.5 | 2 | — |
| | b | — | — | 1.5 |
| | c | — | — | — |
| Antioxidant | | 0.5 | 0.5 | 0.5 |
| Coupling Agent | | 1 | 1 | 1 |
| Curability (gel time) | sec | * | * | 976 |
| | evaluation | C | C | C |
| Thermal Discoloration Resistance | (Y.I.) | 14.20 | 40.10 | 7.49 |
| | evaluation | C | C | A |
| Cracking Resistance | | A | A | B |
| Thermal Decomposition Temperature | (° C.) | 288 | 261 | 129 |
| | evaluation | B | C | D |
| Glass Transition Temperature | (° C.) | 132 | 139 | 69 |
| | evaluation | A | A | D |

In Table 4, * indicates ">1200 (sec)".

From the results in the above Table 3 and Table 4, it is known that the resin compositions of Examples are rapidly curable as taking a short gel time and they are discolored little after heat treatment, as compared with the reference samples not containing an oxetane compound with at least one oxetanyl group in one molecule thereof, and therefore, these resin compositions are prevented from being discolored in reflow soldiering and can have high transparency even after heat treatment. In particular, the resin compositions of Examples 9 to 18 have a higher glass transition temperature and a higher thermal decomposition temperature and are excellent in cracking resistance, as compared with the sample of Reference Example 3, and therefore it is known that these resin compositions have stable physical properties.

Accordingly, when the photocurable resin composition of the invention is used as a molding material for optical components such as lenses and as a photocurable adhesive for fixation of optical components, the time necessary in the molding step can be shortened since the curability thereof is good, and in addition, it gives optical products of high reliability that are excellent in cracking resistance, transparency and heat resistance.

As opposed to this, the samples of Reference Example 1 and Reference Example 2 are poor in curability and thermal discoloration resistance (transparency) as compared with the resin compositions of Examples of the invention. The sample of Reference Example 3 is excellent in thermal discoloration resistance, but its curability is insufficient and its glass transition temperature and thermal decomposition temperature are low, and the sample is poor in physical properties.

While the invention has been described in detail with reference to specific embodiments thereof, it will be apparent to one skilled in the art that various changes and modifications can be made therein without departing from the spirit and scope thereof.

Incidentally, the present application is based on Japanese Patent Applications No. 2009-145500 filed on Jun. 18, 2009, No. 2009-267702 filed on Nov. 25, 2009 and No. 2010-084867 filed on Apr. 1, 2010, and the contents are incorporated herein by reference.

Also, all the references cited herein are incorporated as a whole.

The photocurable resin composition of the invention exhibits excellent adhesiveness even after cured, not detracting from the curability, and forms a three-dimensional molded article (cured product) having high transparency. Accordingly, the resin composition is useful for optical applications as a molding material for optical components such as lenses (material for optical components) and a photocurable adhesive for fixation of optical components. Since the optical component using the photocurable resin composition of the invention has high reliability, it is usable as optical components such as optical lenses (optical products).

What is claimed is:

1. A photocurable resin composition comprising the following ingredients (A), (B), (C) and (D):
   (A) a linear chain epoxy resin represented by the following general formula (1):

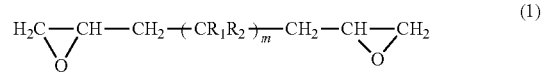

(1)

wherein m indicates an integer of from 2 to 10, and $R_1$ and $R_2$ each represent a hydrogen atom or a fluorine atom;
   (B) an alicyclic epoxy resin having at least two epoxy groups in one molecule thereof;
   (C) a phosphorus fluoride-based photopolymerization initiator; and (D) an oxetane compound having at least one oxetanyl group in one molecule thereof, wherein a content of ingredient (A) is within a range of from 10 to 75% by weight of all the resin ingredients in the composition, a content of ingredient (B) is within a range of from 25 to 75% by weight of all the resin ingredients in the composition, a content of ingredient (C) is within a range of from 0.01 to 7 parts by weight of all the resin ingredients in the composition, and a content of ingredient (D) is within a range of from 3 to 30% of all the resin ingredients.

2. The photocurable resin composition according to claim 1, wherein the ingredient (C) comprises an anion component and a cation component, and the anion component is an onium salt having a structure represented by the following general formula (2):

$$[PF_n(X)_{6-n}]^- \quad (2)$$

wherein n indicates an integer of from 1 to 6, and X represents a fluoroalkyl group having from 1 to 9 carbon atoms or a fluorophenyl group.

3. The photocurable resin composition according to claim 2, wherein, in the anion component represented by the general formula (2), n is an integer of from 1 to 5.

4. An optical component obtained by using the photocurable resin composition according to claim 1.

5. An optical component obtained by using the photocurable resin composition according to claim 2.

6. An optical component obtained by using the photocurable resin composition according to claim 3.

* * * * *